(12) United States Patent
Jung

(10) Patent No.: US 8,115,449 B2
(45) Date of Patent: Feb. 14, 2012

(54) WIRELESS POWER CHARGING SYSTEM

(76) Inventor: Chun-Kil Jung, Seoul (KR)

( * ) Notice: Subject to any disclaimer, the term of this patent is extended or adjusted under 35 U.S.C. 154(b) by 820 days.

(21) Appl. No.: 12/147,128

(22) Filed: Jun. 26, 2008

(65) Prior Publication Data

US 2009/0267558 A1 Oct. 29, 2009

(30) Foreign Application Priority Data

Apr. 28, 2008 (KR) ................ 10-2008-0039135

(51) Int. Cl.
*H02J 7/00* (2006.01)
(52) U.S. Cl. .................... 320/108; 320/107; 320/132
(58) Field of Classification Search ............... 320/108
See application file for complete search history.

(56) References Cited

U.S. PATENT DOCUMENTS

| | | | | |
|---|---|---|---|---|
| 7,791,312 | B2 * | 9/2010 | Kook .................... | 320/108 |
| 7,830,116 | B2 * | 11/2010 | Toya et al. ............ | 320/108 |
| 2004/0060517 | A1 * | 4/2004 | Vukovic et al. ........ | 118/723 I |
| 2004/0173368 | A1 * | 9/2004 | Dickson ................ | 174/35 C |
| 2007/0001921 | A1 * | 1/2007 | Takahashi et al. .... | 343/788 |
| 2007/0252771 | A1 * | 11/2007 | Maezawa et al. ..... | 343/841 |
| 2008/0245563 | A1 * | 10/2008 | Naito et al. ........... | 174/392 |
| 2008/0265835 | A1 * | 10/2008 | Reed et al. ............ | 320/108 |
| 2009/0075068 | A1 * | 3/2009 | Pyo et al. .............. | 428/336 |

FOREIGN PATENT DOCUMENTS

| | | |
|---|---|---|
| JP | 07-320963 | 12/1995 |
| JP | 08-079976 | 3/1996 |
| JP | 2003-247164 A | 9/2003 |
| JP | 2005094843 A | 4/2005 |
| JP | 2006-029787 A | 2/2006 |
| JP | 2006-102055 | 4/2006 |
| JP | 2006-141170 A | 6/2006 |
| JP | 2007-042907 A | 2/2007 |
| JP | 2008048482 A | 2/2008 |
| JP | 2008-289241 | 11/2008 |
| KR | 1020080005020 A | 1/2008 |
| KR | 10-0819753 | 3/2008 |
| KR | 10-0819753 B1 | 3/2008 |
| KR | 100819753 B1 | 4/2008 |

* cited by examiner

*Primary Examiner* — Edward Tso
*Assistant Examiner* — Johali Torres Ruiz
(74) *Attorney, Agent, or Firm* — Echelon Law Group, PC

(57) ABSTRACT

A non-contact power charging system includes a wireless power transmission apparatus 10 for transmitting a power signal from a primary core 14 via a resonant converter 13 by the control of a transmission control unit 12; and a wireless power receiving apparatus 20 for receiving the power signal transmitted from the primary core 14 of the wireless power transmission apparatus 10 via a secondary core 24 and charging a battery cell 21 by the control of a receiving control unit 22. The wireless power receiving apparatus 20 includes a receiving shield panel 25 and an eddy current reducing member 26 in the side of the secondary core 24 to shield an electromagnetic field generated from the secondary core 24, to thereby protect the charging system and the battery pack from the electromagnetic field.

16 Claims, 5 Drawing Sheets

WIRELESS POWER CHARGING SYSTEM

CLAIM OF PRIORITY

This application claims the benefit of Korean Patent Application No. 10-2008-0039135 filed on Apr. 28, 2008, in the Korean Intellectual Property Office, the disclosure of which is incorporated herein by reference.

BACKGROUND OF THE INVENTION

1. Field of the Invention

The present invention relates to a wireless power charging system, and more particularly, to a non-contact power charging system having a shielding member and an eddy current reducing member in primary and secondary core sides to protect both the charging system and a battery pack from the electromagnetic field.

2. Description of the Related Art

Portable electronic devices, such as cellular phones, personal digital assistants (PDAs), portable media players (PMPs), digital multimedia broadcasting terminal (DMB terminals), MPEG audio layer 3 (MP3) players or notebook computers, cannot be plugged into the regular power at home or office since they are generally used while the users are moving. Accordingly, the portable electronic devices are equipped with batteries or rechargeable batteries.

A charging system has been used to charge electric power, supplied from a regular power source, to the batteries or a battery pack of the portable devices via power supply lines or power supply connectors. However, when the charger and the batteries are connected or disconnected to replenish the electric power of the batteries with this connector supply system, an instant discharge may happen because of the potential differences between the charger connector and the battery connector. Hence the foreign substances will be gradually gathered on both connectors and finally there may be a fire disaster as well as the badly lowered charging quality. Furthermore, since the connectors are exposed in the air, the collected humidity and dust on the connectors may cause the natural discharge of the battery. Other problems will be involved like the declining battery life, the low battery quality, and so on.

To solve the above-mentioned problems of the charging system using the power supply connectors, non-contacting charging systems have been developed. In this non-contacting charging system in accordance with the prior art, the device having the battery to be charged is placed over the primary coil of the non-contacting charging system and the battery will be charged by the secondary coil of the battery. The battery is charged with the induced electricity from the induced electromotive force of the secondary coil by the generated magnetic field from the primary coil.

The conventional non-contacting charging systems with the prior art can only be used to supply the electricity to the portable devices. There are limited practical uses because they cannot be used in various alternatives.

Besides, if a metal is placed inside the effective radius of the generated magnetic field of the primary coil, there would be a lot loss of the electricity in the primary coil due to the changes of the magnetic field, so that non-contacting charging system may be damaged. The circuit composition parts of the wireless power charging system, the portable devices and the batteries can be damaged by the existing electromagnetic field between the primary coil and the secondary coil. The malfunction of those devices may also happen without warning.

SUMMARY OF THE INVENTION

To solve the above-mentioned problems, the present invention is directed to a wireless power charging system constructed to charge battery packs or portable devices without any actual contacts among them so that there will not be any fire hazards caused by the connector contacts. A better power transmission efficiency is also expected to get since there will not be any bad connection problems due to the foreign substances among the connectors.

The present invention is also directed to protect both a wireless power charging system and a battery pack from an electromagnetic field generated by a primary core and a secondary core by installing a shielding member and an eddy current reducing member respectively in both a primary core of a wireless power transmission apparatus and a secondary core of a wireless power receiving apparatus.

Consequently, the purpose of the present invention is to get a better charging capacity of the charging system and the battery pack by maintaining stable temperature of the battery and keeping unweakened charging capacity of the battery pack even in 500 times of charge/discharge experiments.

According to an aspect of the present invention, a wireless power charging system in accordance with the present invention includes a wireless power transmission apparatus for transmitting a power signal from a primary core via a resonant converter by the control of a transmission control unit; and a wireless power receiving apparatus for receiving the power signal transmitted from the primary core of the wireless power transmission apparatus via a secondary core and charging a battery cell by the control of a receiving control unit. The wireless power receiving apparatus includes a receiving shield panel and an eddy current reducing member in the side of the secondary core to shield an electromagnetic field generated from the secondary core.

The receiving shield panel of the wireless power receiving apparatus 20 can be composed of 25~35 parts by weight of polyurethane for every 65~75 parts by weight of sendust.

Further, the eddy current reducing member of the wireless power receiving apparatus can be made of net-shaped polyester plated with an eddy current reducing composition, wherein the eddy current reducing composition comprises 35~45 parts by weight of zinc for every 55~65 parts by weight of nickel.

The wireless power transmission apparatus may include a transmission shield panel in the side of the primary core to shield the electromagnetic field generated from the primary core, and the transmission shield panel of the wireless power transmission apparatus can be made of 35~45 parts by weight of polyurethane for every 55~65 parts by weight of sendust.

Moreover, the wireless power transmission apparatus may include a power supply module for supplying electric power, such that the power signal is transmitted from the primary core; a display unit for displaying an operation status of the wireless power transmission apparatus, an operation status of the wireless power receiving apparatus, and a charging status of the battery cell; and a transmission memory unit. The transmission control unit may include a pre-driver for operating the resonant converter by the control of a main controller; and a received signal process block for receiving a signal detected from the primary core and transmitting the detected signal to the main controller.

The wireless power charging system of the present invention formed with the above-mentioned figures is constructed to charge battery packs or portable devices without any actual contacts among them so that there will not be any fire hazards caused by the connector contacts. A better power transmission efficiency is also expected to get since there will not be any bad connection problems due to the foreign substances among the connectors.

Since the shielding member and the eddy current reducing member are especially installed in the primary core of the wireless power transmission apparatus and the secondary core of the wireless power receiving apparatus respectively, there is an excellent effect on protecting both the charging system and the battery pack from the electromagnetic shield generated by the primary core and the secondary core.

Thus, there is an advantage of providing a reliable and better charging capacity of the charging system and the battery pack by maintaining stable temperature of the battery pack and keeping unweakened charging capacity of the battery pack even in 500 times of charge/discharge experiments.

DETAILED DESCRIPTION OF THE PREFERRED EMBODIMENT

The invention will now be described in detail with reference to the accompanying drawings.

Figure 1:
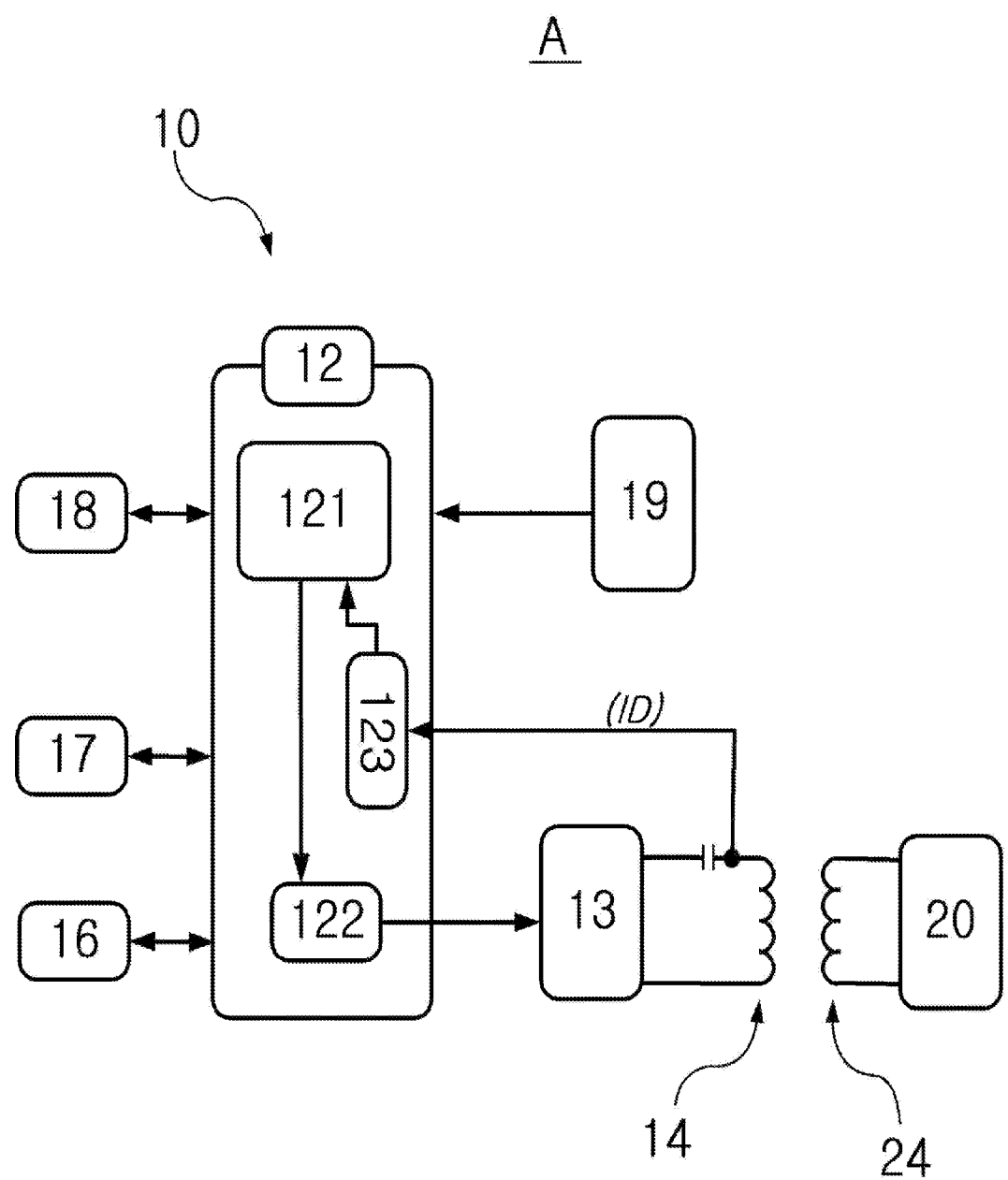
FIG. 1 is a schematic configuration view of a wireless power charging system in accordance with the present invention.
Figure 2:
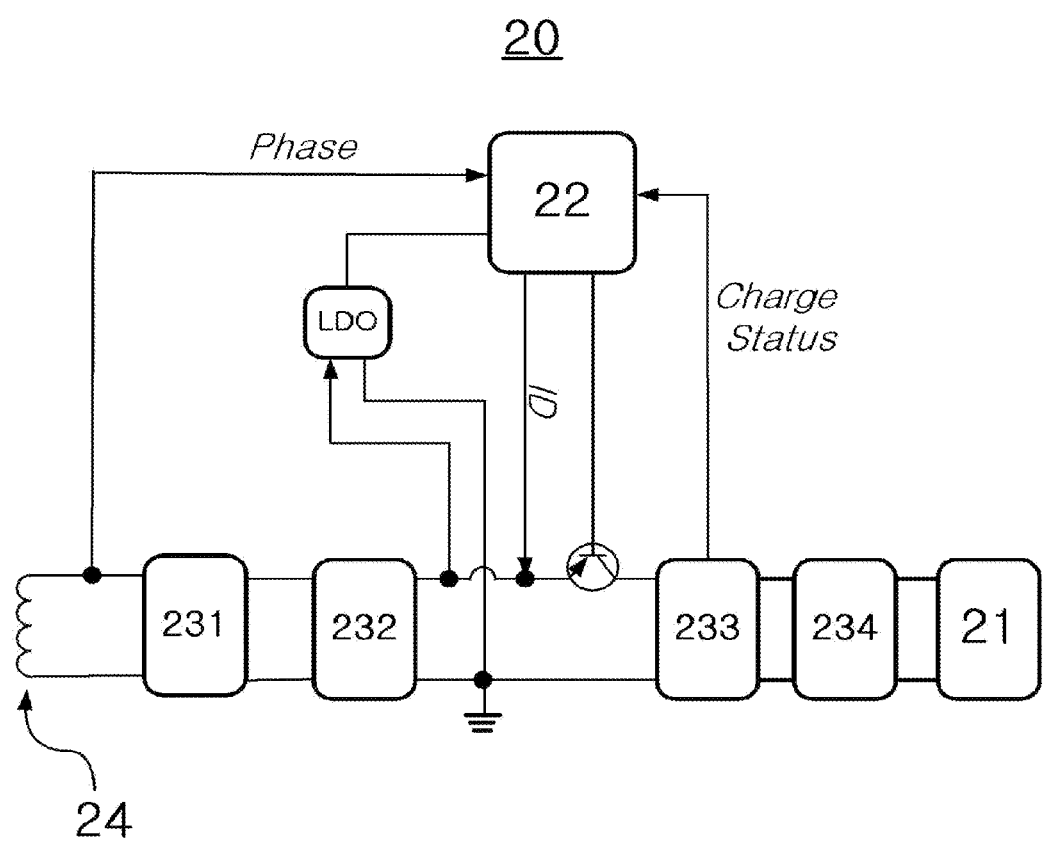
FIG. 2 is a schematic configuration view of a wireless power receiving apparatus of a wireless power charging system in accordance with the present invention.
Figure 3:
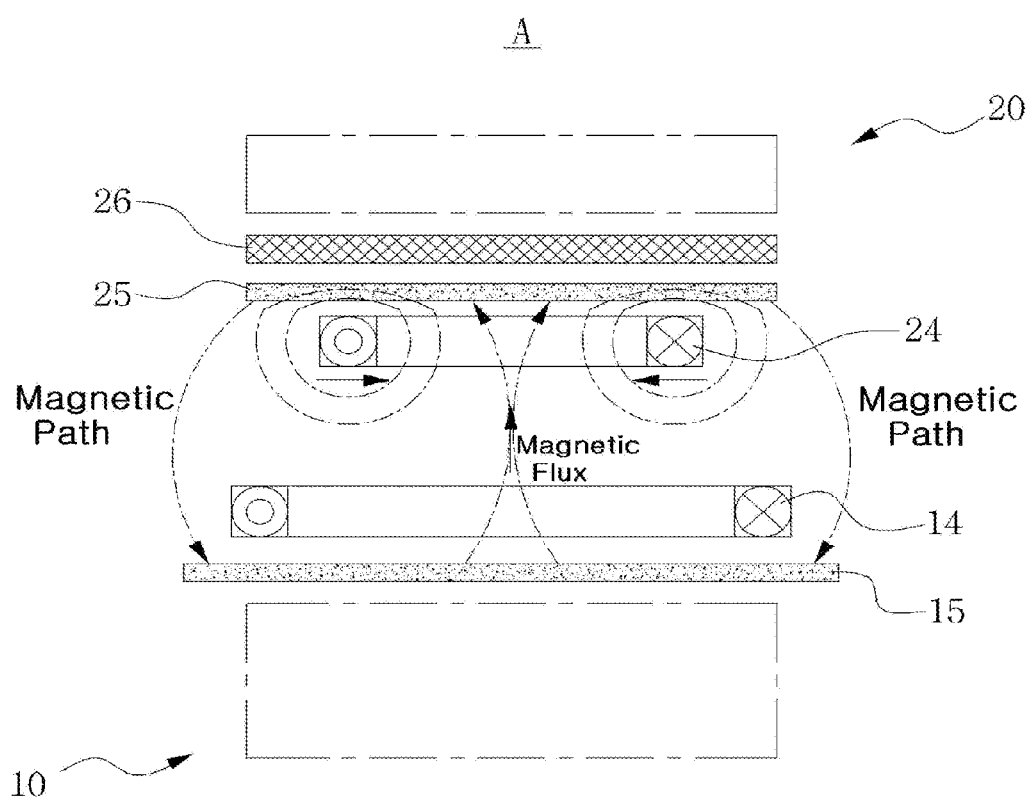
FIG. 3 is a schematic configuration view of a shielding member of a wireless power charging system in accordance with the present invention.
Figure 4:
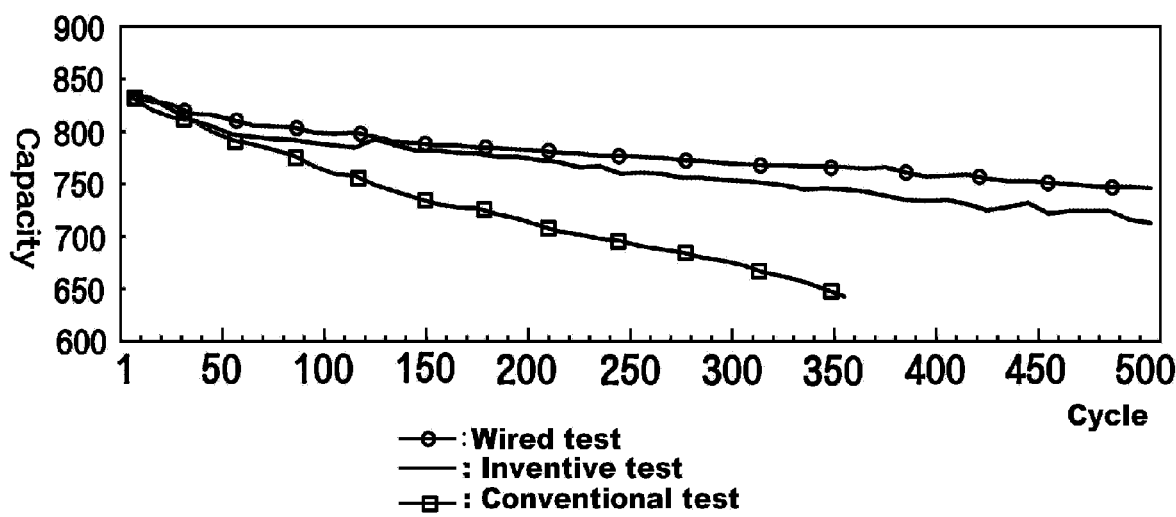
FIG. 4 is a graph of the experiment result of the wireless power charging system in accordance with the present invention.
Figure 5:
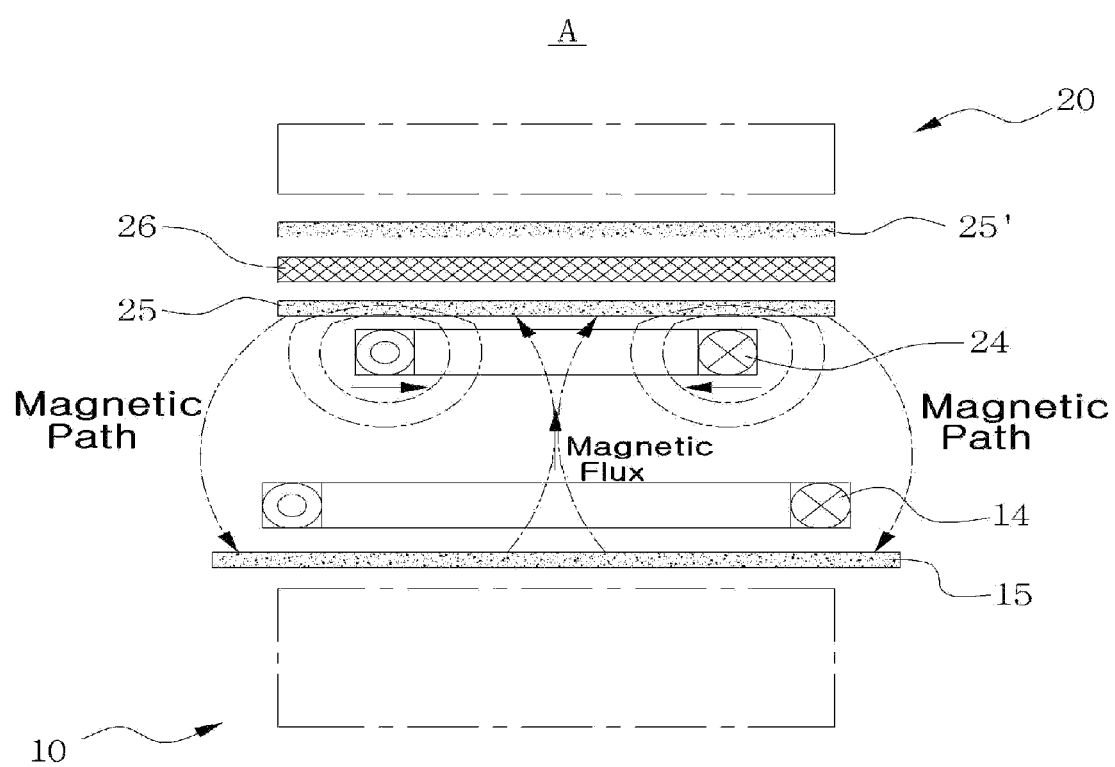
FIG. 5 is a schematic configuration view of shielding members of a wireless power charging system in accordance with another embodiment of the present invention.

FIG. 1 is a schematic configuration view of a wireless power charging system in accordance with the present invention; FIG. 2 is a schematic configuration view of a wireless power receiving apparatus of the wireless power charging system in accordance with the present invention; FIGS. 3 and 5 are a schematic configuration view of a shielding member of the wireless power charging system in accordance with the present invention; and FIG. 4 is a graph of the experiment result of the wireless power charging system in accordance with the present invention.

Referring to FIGS. 1 to 5, a wireless power charging system A in accordance with the present invention includes a wireless power transmission apparatus 10 for transmitting a power signal from a primary core 14 via a resonant converter 13 by the control of a transmission control unit 12; and a wireless power receiving apparatus 20 for receiving the power signal transmitted from the primary core 14 of the wireless power transmission apparatus 10 via a secondary core 24 and charging a battery cell 21 by the control of a receiving control unit 22.

The wireless power transmission apparatus 10 of the wireless power charging system A is constructed to transmit the power signal by the induced electromagnetic field from the primary core 14. For detailed configuration, the wireless power transmission apparatus 10 may include a power supply module 16 for supplying the power to the wireless power transmission apparatus 10; a display unit 17 for displaying the operation status of the wireless power transmission apparatus 10, the operation status of the wireless power receiving apparatus 20, and the charging status of the battery cell 21 by the control of the transmission control unit 12; and a transmission memory unit 18.

The transmission control unit 12 may include a pre-driver 122 for operating the resonant converter 13 by the control of a main controller 121; and a received signal process block 123 for receiving a signal detected from the primary core 14 and transmitting the detected signal to the main controller 121.

Further, the wireless power transmission apparatus 10 can include a temperature sensing module 19 for detecting the temperature of the parts of the wireless transmission apparatus 10 such as the power supply module 16, the resonant converter 13, and so on, and sending the normal/abnormal signal to the transmission control unit 12.

For power supply, the wireless power transmission apparatus 10 can be plugged into the computers, notebook computers, regular power at home or office, any portable power sources such as vehicles, electric generator or high-capacity power charging equipment. Therefore, the power supply module 16 of the wireless power transmission apparatus 10 can be formed to use selectively with only one power source or formed to use with a plurality of power sources with the multi-purpose plug. For plugging into the computer or notebook computer, a USB type connector can be installed or a proper type of converter can be formed together with the power supply module 16. For the regular power sources, a home connector or factory connector (single-phase or three-phase) for the regular power sources can be formed and a proper type of converter can be installed with the power supply module 16. For the mobile power sources like vehicles, an exclusive connector like a car cigar jack can be formed and a proper type of converter can be formed with the power supply module 16 as well. For the electric generator or high-capacity power charging equipment, a proper connector for connecting with the devices can be formed and a suitable converter can be formed for the stable power supply from the devices.

For the power supply to the wireless power transmission apparatus 10, a plurality of methods can be used for normal power supply or a single source can be selected as above-mentioned. For the general application these days, a plurality of power supply connectors like a multi-connector type can be used.

The supplied power from the power supply module 16 is supplied to the resonant converter 13 and the power signal is transmitted by generating the induced electromagnetic field by the primary core 14 connected with the resonant converter 13.

With the control of the transmission control unit 12, the power signal is transmitted by the oscillating signal processed in the pre-driver 122; a full-bridge resonant converter can be used for the resonant converter 13; and the pre-driver can be formed to include a gate driver and so on. It is apparent to those skilled in the art that the present invention is not to be limited to those detailed configurations but a number of modifications and variations in accordance with the present invention can be applied and used.

The transmission control unit 12 may further include a signal process block (not shown) for processing the transmitted signal from the temperature sensing module 19 and transmitting it to the main controller 121; a data process block (not shown) for processing the input/output data and the transmission memory unit 18; a display signal process block (not shown) for processing the transmitted signal, such as the status signal or the alarm signal of the wireless power transmission apparatus 10 and the wireless power receiving apparatus 20, which is being sent to a display unit 17; and a power signal process block (not shown) for processing the transmitted signal between the power supply module 16.

The received signal process block 123 for processing the detected signal in the primary core 14 sends out the detected signal of the transmitted signal from the primary core 14 and the non-contacting wireless power receiving apparatus 20 to the main control unit 12. Generally, the received signal process block 123 collects the power receiving status and the control status of the wireless power receiving apparatus 20, and the charging status of the battery pack; and sends out to the transmission control unit 12.

Then the transmission control unit 12 diagnoses the received data and displays the data via the display unit 17. Otherwise, the transmission control unit 12 can be formed to control the wireless power signal transmitted from the primary core 14 by controlling the pre-driver 122 and the resonant converter 13.

The wireless power receiving apparatus 20, which receives the power by the induced electromagnetic field from the wireless power transmission apparatus 10, is formed to receive the power as an induced electromotive force via the secondary core 24 and charge the power into the battery cell 21 by the control of the receiving control unit 22 after the power is processed by a rectifier unit 231 and a filter unit 232. While the power is transmitted from the wireless power transmission apparatus 10 to the wireless power receiving apparatus 20 using the electromagnetic field generated between the primary core 14 and the secondary core 24, the control signal and the communication signal are also transmitted and received between the wireless power transmission apparatus 10 and the wireless power receiving apparatus 20. As above mentioned, the wireless power transmission apparatus 10 receives the transmitted signal from the wireless receiving apparatus 20 via the received signal process block 123 connected with the primary core 14. In the wireless power receiving apparatus 20, the receiving control unit 22 can be formed with the received signal process block (not shown) connected with the secondary core 24 and the signal can be detected at the connecting portion between the rectifier unit 231 and the filter unit 232. As a result of this process, the transmitted signal from the wireless power transmission apparatus 10 can be received and diagnosed in the wireless power receiving apparatus 20.

Since the wireless power transmission apparatus 10 cannot diagnose whether there is any wireless power receiving apparatus 20 near to the primary core 14 or not when it is ready for the wireless power transmission for the first time, it regularly sends out the sensing signal as a pulse signal by a predetermined cycle. This pulse sensing signal forms the induced electromagnetic field around the primary core 14 and the transmission control unit 12 can detect the approaching object via the primary core 14 because the induced electromagnetic field is being changed when the wireless power receiving apparatus 20 is approaching. The wireless power transmission apparatus 10 is sending out the signal asking for the unique ID data signal together with the pulse signal, the receiving control unit 22 of the wireless power receiving apparatus 20 is sending out its unique ID signal as a return signal.

Consequently, when the wireless power transmission apparatus 10 recognizes the returned signal as a proper unique ID of the wireless power receiving apparatus 20, it starts transmitting the wireless power signal via the primary core 14.

In the wireless power receiving apparatus 20, the received power signal via the secondary core 24 is processed by the rectifier unit 231 and the filter unit 232 and then charges the battery cell 21 with the power via a charging block 233 (Charger IC). The charging status of the battery cell 21 is detected via a protection circuit module 234 (PCM) and the detected signal is sent to the receiving control unit 22, such that the charging operation is controlled according to the charging status or fully charged status of the battery cell 21. All the information transmitted from the battery pack regarding the charging status, the charged amount, and the battery pack status will be received by the wireless power transmission apparatus 10; and this information will be displayed on the display unit 17 after being diagnosed in order for the user can use it.

As above mentioned, in the wireless power charging system A broadly having the wireless power transmission apparatus 10 and the wireless power receiving apparatus 20, the power transmission and the receiving/sending of the data signal are possible by generating the induced electromagnetic field between the primary core 14 and the secondary core 24.

For the power transmission and the receiving/sending of the data signal, both the power transmission components of the wireless power transmission apparatus 10 like the transmission control unit 12 and the power receiving components of the wireless power receiving apparatus 20 like the receiving control unit 22 need to be configured together. That is the reason why shielding members such as Hanrim Postech Electro-magnetic Shields (HPESs) for protecting the components of the wireless power transmission apparatus 10 and the wireless power receiving apparatus 20 from the induced electromagnetic field are installed. For these shielding members, a transmission shied panel 15 (transmission HPES) can be provided in the wireless power transmission apparatus 10, and a receiving shield panel 25 (receiving primary HPES) and an eddy current reducing member 26 (receiving secondary HPES) can be provided in the wireless power receiving apparatus 20.

Therefore, the transmission shield panel 15 is formed in the primary core 14 side of the wireless power transmission apparatus 10 for shielding the electromagnetic field generated from the primary core 14 and the secondary core 24.

The transmission shield panel 15 of the wireless power transmission apparatus 10 can be made of 35~45 parts by weight of polyurethane for every 55~65 parts by weight of sendust.

The receiving shield panel 25 and the eddy current reducing member 26 are formed in the secondary core 24 side of the wireless power receiving apparatus 20 for shielding the electromagnetic field generated from the primary core 14 and the secondary core 24.

The receiving shield panel 25 of the wireless power receiving apparatus 20 can be made of 25~35 parts by weight of polyurethane for every 65~75 parts by weight of sendust.

The eddy current reducing member 26 of the wireless power receiving apparatus 20 can be made of net-shaped polyester which is plated with the eddy current reducing composition and the eddy current reducing composition can consist of 35~45 parts by weight of zinc for every 55~65 parts by weight of nickel.

The sendust is a high permeability alloy consisting of aluminum, silicon, and iron. The transmission shield material 15 is made with a combination of sendust and polyurethane which have an excellent shielding performance. When the sendust is composed of lower than 55 parts by weight, it is apprehended that the shielding performance will be lowered. When the sendust is composed of more than 75 parts by weight, there will be a few improvement compared to the input. The wireless power transmission apparatus 10 may have the smaller magnetism density per unit area than the wireless power receiving apparatus 20, it may be composed of 55~65 parts by weight of sendust for every 35~45 parts by weight of polyurethane. It also can consist of 60 parts by weight of sendust for every 40 parts by weight of polyurethane.

On the other hand, since the wireless power receiving apparatus 20 can be easily exposed to the electromagnetic field by the secondary core 24 and the primary core 14, it is apprehended that the data loss or the malfunction may happen and the sendust content may be heightened for preventing the rising temperature of the portable battery pack. The receiving shield panel 25 of the wireless power receiving apparatus 20 can be composed of 65~75 parts by weight of sendust and 25~35 parts by weight of polyurethane and it also can be composed of 70 parts by weight of sendust for every 30 parts by weight of polyurethane.

The induced electromagnetic field can be effectively shielded by the transmission shield panel 15 formed as a panel shape and made of sendust included and the electromagnetic field from the secondary core 24 can be effectively shielded by the receiving shield panel 25.

Moreover, there may be a possibility of the eddy current in the wireless power receiving apparatus 20 so that it can be formed to reduce the eddy current by the eddy current reducing member 26.

This eddy current reducing member is formed as a net shape, which is the net-shaped polyester plated with the eddy current reducing composition. And the current reducing composition can consist of 35~45 parts by weight of zinc for every 55~65 parts by weight of nickel.

Since the eddy current reducing composition consisting of nickel and zinc is plated on the surface of the polyester, the eddy current reducing member 26 is consequently made of a kind of net-shaped alloy. The spiral effect of the eddy current reducing member 26 can reduce the eddy current, generated from the electromagnetic field by the primary core 14 and the secondary core 24, so as to protect the wireless power receiving apparatus 20. Because a plurality of alloy mesh can reduce the eddy current respectively by the net-shaped alloy mesh of the eddy current reducing member 26, the eddy current generated from the electromagnetic field can be reduced over all in the battery pack of the wireless power receiving apparatus 20.

The eddy current reducing member 26 is composed of a net-shaped alloy with 100-mesh or 200-mesh, more preferably with 135-mesh.

Further, the wireless power receiving apparatus 20 of the wireless power charging system A according to the present invention includes a receiving shied panel 25 (a receiving primary HPES) and an eddy current reducing member 26 (a receiving secondary HPES) to protect the electric circuit of the wireless power receiving apparatus 20 and the battery cell 21 from the electromagnetic field generated between the primary core 14 and the secondary core 24. The receiving primary HPES and the receiving secondary HPES, mesh-formed, can be installed with several layers by forming a successive double-layer. As shown in FIG. 5, with the eddy current reducing member 26 (receiving secondary HPES) as the central figure, the receiving shield panel 25 (the receiving primary HPES) can be formed beneath the eddy current reducing member 26 and the secondary receiving shield panel 25' can be formed above the eddy current reducing member 26 additionally. Total configuration and the numbers of the receiving secondary HPES as the eddy current reducing member 26 and the receiving primary HPES as the receiving shield panel 25 and the secondary receiving shield panel 25' can be properly configured depending on the types of the wireless power transmission apparatus 10 and the wireless receiving apparatus 20, the distance between the cores, and the circuit composition of the devices. By doing this properly, the circuit of the wireless power receiving apparatus 20 can be working stable and the battery cell 21 can be charged securely without any overheating.

Embodiment

Referring to FIG. 3, in the wireless power transmission apparatus 10 of the wireless power charging system A in accordance with the present invention, the transmission shield panel 15 as a panel-shape was formed around the primary core 14 and the transmission shield panel 15 was composed of 40 parts by weight of polyurethane for every 60 parts by weight of sendust as an embodiment.

The wireless power receiving apparatus 20 was tested as being a battery pack. In the battery pack, the eddy current reducing member 26 was formed around the secondary core 24 together with the receiving shield panel 25 as a panel-shape; the receiving shield panel 25 was composed of 30 parts by weight of polyurethane for every 70 parts by weight of sendust; and the eddy current reducing member 26 was a mesh-screen polyester plated with the eddy current reducing composition consisting of 40 parts by weight of zinc for every 60 parts by weight of nickel and was also a net-shaped alloy with 135-mesh as an embodiment. In this Embodiment, the shielding members (HPESs) were implemented as the transmission shield panel 15 (transmission HPES) of the wireless power transmission apparatus 10, and the receiving shield panel 25 (receiving primary HPES) and the eddy current reducing member 26 (receiving secondary HPES) of the wireless power receiving apparatus 20.

Test Example

As formed in the above-mentioned Embodiment, the shielding members (HPESs) including the transmission shield panel (transmission HPES, 15), the receiving shield panel (receiving primary HPES, 25), and the eddy current reducing member (receiving secondary HPES, 26) was subjected to a test under below conditions.

Input voltage of the wireless power transmission apparatus 10 is 5.4V, the electric current is 700 mA, and the distance between the primary core 14 and the second core 24 is 3 mm for the test.

The diameters of the primary core 14 and the transmission shield panel 15, both are round-shaped, are 50 mm and 55 mm respectively; and the secondary core 24 and the receiving shield panel 25 are also round-shaped, and their diameters are 30 mm and 34 mm, respectively.

The temperatures are measured for two times: the initial temperature of the battery cell at the beginning and the second temperature after 500 times of charge/discharge test. Inventive Example was formed with the shielding member (HPES) and Conventional Example was without the shielding member. The temperature of both battery cells of the battery packs was measured as well.

TABLE 1

| Type | DPC* (mm) | IVPS* (V) | CPS* (mA) | DPS* | DSC* (mm) | TBC* (° C.) | Remark |
|---|---|---|---|---|---|---|---|
| Con. Exam | 50 | 5.4 | 700 | 3 mm | 30 | 50.5 | Overheating |
| Inventive Exam | 50 | 5.4 | 700 | 3 mm | 30 | 40 | Stable temp |

Note)
DPC: Diameter of primary core, IVPS: Input voltage at primary side
CPS: Current at primary side,
DPS: Distance between primary and secondary sides
DSC: Diameter of secondary core, TBC: Temperature of battery cell
(Measure temperature of the battery cell with/without the shielding member (HPES))

Referring to the table 1, Test Example was about the charge/discharge test for the conventional charging system of the prior art without the shielding member in the wireless power transmission apparatus and the wireless power receiving apparatus having the shielding member (HPES) in accordance with the above-mentioned Embodiment of the invention. Although the temperature of both battery cells were 30° C. before the test, the temperature of the conventional charging system without the shielding member was increased up to 50.5° C. and the temperature of the present invention formed with the shielding member was measured at 40° C. after 500 times of charge/discharge test as shown in the table 1. This means that the temperature will be continuously increased when the charge/discharge test continues with the conventional technique. Consequently, the battery may be exploded or it may cause the problems with the battery. On the other side, in accordance with the present invention, since the temperature did not go up and stayed at the secure level, the battery can be used securely.

TABLE 2

SAMPLE #1: Charge/discharge test with wired power source

| Cycle | 1 | 10 | 20 | 30 | 40 | 50 | 60 | 70 | 80 | 90 | 100 | 110 | 120 |
|---|---|---|---|---|---|---|---|---|---|---|---|---|---|
| Capacity | 832 | 829 | 826 | 817 | 816 | 811 | 806 | 805 | 804 | 799 | 798 | 799 | 795 |
| Cycle | 130 | 140 | 150 | 160 | 170 | 180 | 190 | 200 | 210 | 220 | 230 | 240 | 250 |
| Capacity | 790 | 789 | 787 | 787 | 785 | 784 | 783 | 782 | 780 | 779 | 777 | 777 | 776 |
| Cycle | 260 | 270 | 280 | 290 | 300 | 310 | 320 | 330 | 340 | 350 | 360 | 370 | 380 |
| Capacity | 775 | 773 | 772 | 770 | 769 | 768 | 768 | 767 | 767 | 766 | 765 | 766 | 761 |
| Cycle | 390 | 400 | 410 | 420 | 430 | 440 | 450 | 460 | 470 | 480 | 490 | 500 | |
| Capacity | 757 | 758 | 759 | 755 | 753 | 753 | 751 | 750 | 748 | 747 | 747 | 746 | |

TABLE 3

SAMPLE #2: Charge/discharge test without the shielding member of the prior art

| Cycle | 1 | 10 | 20 | 30 | 40 | 50 | 60 | 70 | 80 | 90 | 100 | 110 | 120 |
|---|---|---|---|---|---|---|---|---|---|---|---|---|---|
| Capacity | 834 | 821 | 814 | 811 | 800 | 792 | 788 | 783 | 777 | 767 | 760 | 758 | 749 |
| Cycle | 130 | 140 | 150 | 160 | 170 | 180 | 190 | 200 | 210 | 220 | 230 | 240 | 250 |
| Capacity | 743 | 737 | 731 | 728 | 727 | 721 | 717 | 711 | 705 | 702 | 698 | 696 | 691 |

TABLE 3-continued

SAMPLE #2: Charge/discharge test without the shielding member of the prior art

| | Cycle | | | | | | | | | | | | |
|---|---|---|---|---|---|---|---|---|---|---|---|---|---|
| | 260 | 270 | 280 | 290 | 300 | 310 | 320 | 330 | 340 | 350 | 360 | 370 | 380 |
| Capacity | 688 | 685 | 680 | 677 | 673 | 666 | 662 | 657 | 650 | 643 | Drop | | |
| | Cycle | | | | | | | | | | | | |
| | 390 | 400 | 410 | 420 | 430 | 440 | 450 | 460 | 470 | 480 | 490 | 500 | |
| Capacity | | | | | | | | | | | | | |

TABLE 4

SAMPLE #3: Charge/discharge test with the shielding member according to the present invention

| | Cycle | | | | | | | | | | | | |
|---|---|---|---|---|---|---|---|---|---|---|---|---|---|
| | 1 | 10 | 20 | 30 | 40 | 50 | 60 | 70 | 80 | 90 | 100 | 110 | 120 |
| Capacity | 836 | 832 | 821 | 811 | 805 | 797 | 795 | 793 | 792 | 789 | 787 | 785 | 793 |
| | Cycle | | | | | | | | | | | | |
| | 130 | 140 | 150 | 160 | 170 | 180 | 190 | 200 | 210 | 220 | 230 | 240 | 250 |
| Capacity | 787 | 782 | 782 | 780 | 779 | 776 | 776 | 773 | 771 | 766 | 767 | 760 | 761 |
| | Cycle | | | | | | | | | | | | |
| | 260 | 270 | 280 | 290 | 300 | 310 | 320 | 330 | 340 | 350 | 360 | 370 | 380 |
| Capacity | 760 | 756 | 756 | 754 | 753 | 751 | 749 | 745 | 746 | 745 | 743 | 739 | 735 |
| | Cycle | | | | | | | | | | | | |
| | 390 | 400 | 410 | 420 | 430 | 440 | 450 | 460 | 470 | 480 | 490 | 500 | |
| Capacity | 734 | 735 | 731 | 725 | 728 | 732 | 722 | 724 | 724 | 724 | 716 | 713 | |

Table 2 is a charge/discharge test for the charging system and the battery pack connected with a wired power source, and the table 3 is a charge/discharge test for the wireless charging system of the prior art without the shielding member. And the table 4 is a charge/discharge test for the wireless charging system formed with the shielding member in accordance with the present invention and each case of capacity was measured respectively.

For the normal wired connecting system, the first charging capacity was 832 and the last charging capacity was 746 after 500 times of charge/discharge test. These numbers will be used as base numbers.

For the conventional wireless charging system and the battery pack without the shielding member, the first charging capacity was 834 which is almost similar to the base number and the last charging capacity was only 643 after 360 times of charge/discharge test. And this battery can be used any more.

On the other hand, for the test with the battery pack of the wireless power transmission apparatus and the wireless power receiving apparatus formed with the shielding member in accordance with the present invention, the first charging capacity was 836 and the last charging capacity was 713 after 500 times of charge/discharge test, which shows almost similar charging capacity compared to the base numbers of the table 1.

As shown in the tables 2 to 4 and FIG. 4 which were plotted in a graph, the present invention has an excellent charging quality with the superior charge/discharge characters like the wired test which is connected with the charging system and the battery pack. Besides, since it is not connected with the connectors, there will not be any fire disaster and lowered efficiency of the charge/discharge capacity due to the bad connecting problems.

While the present invention has been described with reference to the particular illustrative embodiments and the accompanying drawings, it is to be appreciated that those skilled in the art can substitute, change or modify the embodiments in various forms without departing from the scope and spirit of the present invention.

What is claimed is:

1. A wireless power charging system comprising:
   a wireless power transmission apparatus for transmitting a power signal from a primary core; and
   a wireless power receiving apparatus for receiving the power signal transmitted from the primary core of the wireless power transmission apparatus via a secondary core and charging a battery cell by the control of a receiving control unit,
   wherein the wireless power transmission apparatus comprises a transmission shield panel in the side of the primary core to shield the electromagnetic field generated from the primary core, and the wireless power receiving apparatus includes a receiving shield panel in the side of the secondary core to shield an electromagnetic field generated from the secondary core, the receiving shield panel having an area smaller than that of the transmission shield panel and containing greater sendust compared to the transmission shield panel.

2. The wireless power charging system according to claim 1, wherein the receiving shield panel of the wireless power receiving apparatus comprises 25~35 parts by weight of polyurethane for every 65~75 parts by weight of sendust.

3. The wireless power charging system according to claim 1, wherein the wireless power receiving apparatus further comprises an eddy current reducing member made of net-shaped polyester plated with an eddy current reducing composition, the eddy current reducing member being disposed behind the receiving shield panel with respect to the secondary core.

4. The wireless power charging system according to claim 3, wherein the eddy current reducing composition comprises 35~45 parts by weight of zinc for every 55~65 parts by weight of nickel.

5. The wireless power charging system according to claim 1, wherein the transmission shield panel of the wireless power transmission apparatus is made of 35~45 parts by weight of polyurethane for every 55~65 parts by weight of sendust.

6. The wireless power charging system according to claim 1, wherein the wireless power transmission apparatus includes:
a power supply module for supplying electric power, such that the power signal is transmitted from the primary core;
a display unit for displaying an operation status of the wireless power transmission apparatus, an operation status of the wireless power receiving apparatus, and a charging status of the battery cell; and
a transmission memory unit,
wherein the transmission control unit includes:
a pre-driver for operating the resonant converter by the control of a main controller; and
a received signal process block for receiving a signal detected from the primary core and transmitting the detected signal to the main controller.

7. A wireless power transmission apparatus for transmitting a power signal to a wireless power receiving apparatus having a secondary core and a receiving shield panel to shield an electromagnetic field generated from the secondary core, the wireless power transmission apparatus comprising:
a primary core configured to be electromagnetically coupled with the secondary core; and
a transmission shield panel disposed to face the primary core, the transmission shield panel having an area larger than that of the receiving shield panel and containing less sendust compared to the receiving shield panel to shield an electromagnetic field generated from the primary core.

8. The wireless power transmission apparatus according to claim 7, wherein the transmission shield panel is made of 35~45 parts by weight of polyurethane for every 55~65 parts by weight of sendust.

9. A wireless power receiving apparatus for receiving a power signal from a wireless power transmission apparatus having a primary core and a transmission shield panel to shield an electromagnetic field generated from the primary core, the wireless power receiving apparatus comprising:
a secondary core configured to be electromagnetically coupled with the primary core; and
a receiving shield panel disposed to face the secondary core, the receiving shield panel having an area smaller than that of the transmission shield panel and containing greater sendust compared to the transmission shield panel to shield an electromagnetic field generated from the secondary core.

10. The wireless power receiving apparatus according to claim 9, wherein the receiving shield panel is made of 25~35 parts by weight of polyurethane for every 65~75 parts by weight of sendust.

11. The wireless power receiving apparatus according to claim 9, further comprising an eddy current reducing member made of net structure plated with an eddy current reducing composition and disposed behind the receiving shield panel with respect to the secondary core.

12. The wireless power receiving apparatus according to claim 11, wherein the eddy current reducing composition comprises 35~45 parts by weight of zinc for every 55~65 parts by weight of nickel.

13. The wireless power receiving apparatus according to claim 11, further comprising another receiving shield panel disposed behind the eddy current reducing member with respect to the secondary core.

14. The wireless power receiving apparatus according to claim 9, further comprising:
a battery cell; and
a receiving control unit configured to allow the battery cell to be charged with the received power signal by the secondary core.

15. The wireless power receiving apparatus according to claim 14, further comprising:
a protection circuit module connecting the receiving control unit to the battery cell,
and transmitting a charging status of the battery cell to the receiving control unit.

16. The wireless power receiving apparatus according to claim 15, wherein the receiving control unit is configured to transmit the received charging status of the battery cell to the wireless power transmission apparatus via the secondary core.

* * * * *